United States Patent

Grall

[11] Patent Number: 5,856,954
[45] Date of Patent: Jan. 5, 1999

[54] PROCESS OF ACOUSTIC EMISSION FOR SONAR

[75] Inventor: Georges Grall, Biot, France

[73] Assignee: Thomson-CSF, Paris, France

[21] Appl. No.: 836,882

[22] PCT Filed: Dec. 15, 1995

[86] PCT No.: PCT/FR95/01679

§ 371 Date: Jun. 27, 1997

§ 102(e) Date: Jun. 27, 1997

[87] PCT Pub. No.: WO96/20415

PCT Pub. Date: Jul. 4, 1996

[30] Foreign Application Priority Data

Dec. 28, 1994 [FR] France .................................. 94 15784

[51] Int. Cl.⁶ ............................................................ G01V 1/38
[52] U.S. Cl. ............................................................. 367/106
[58] Field of Search ....................................... 367/106, 103, 367/88, 153, 154, 4, 5, 6

[56] References Cited

U.S. PATENT DOCUMENTS

| | | | |
|---|---|---|---|
| 3,331,050 | 7/1967 | Kilmer et al. | 367/24 |
| 4,234,939 | 11/1980 | Grall | 367/105 |
| 4,510,586 | 4/1985 | Grall et al. | 367/105 |
| 4,596,007 | 6/1986 | Grall et al. | 367/105 |
| 4,641,290 | 2/1987 | Massa et al. | 367/106 |
| 4,779,239 | 10/1988 | Grall | 367/88 |
| 4,794,574 | 12/1988 | Grall | 367/154 |
| 4,951,268 | 8/1990 | Grall | 367/88 |
| 5,058,081 | 10/1991 | Gulli et al. | 367/130 |
| 5,136,556 | 8/1992 | Obara | 367/163 |
| 5,237,541 | 8/1993 | Woodsum | 36/92 |
| 5,287,330 | 2/1994 | Gilmour | 367/103 |

FOREIGN PATENT DOCUMENTS

| | | |
|---|---|---|
| 1 219 944 | 2/1985 | Canada . |
| 2 611 917 | 2/1987 | France . |
| 2 601 642 | 7/1987 | France . |
| 1 520 031 | 2/1985 | United Kingdom . |

OTHER PUBLICATIONS

Journal of the Acoustical Society of America, vol. 71, Apr. 4, 1982, New York, US, pp. 871–878 A.G. McKay et al.

PH.DE Heering Acoustic Synthetic aperture processing theory and applications, Nov. 7, 1989.

Primary Examiner—Daniel T. Pihulic
Attorney, Agent, or Firm—Oblon, Spivak, McClelland, Maier & Neustadt, P.C.

[57] ABSTRACT

A process of acoustic emission for sonar with a separate emission array from the receiving array. The emission array has the shape of a linear acoustic array and can either be towed simultaneously with linear acoustic receiving array or be suspended from a helicopter to form a "dipping" type sonar. Detection using this type of sonar is facilitated by increasing the sound level via the directivity index, while reducing the level of reverberation originating from the bed and from the surface of the sea.

12 Claims, 5 Drawing Sheets

PROCESS OF ACOUSTIC EMISSION FOR SONAR

The present invention relates to processes which make it possible to emit acoustic signals in water. More particularly, it concerns the application of such a process to systems for activating towed linear arrays. It also concerns the application of this process to deployable active sonar systems for aircraft known as "dipping" sonars.

DISCUSSION OF THE BACKGROUND

It is known that sonars are conventionally divided into two major categories. One of these categories comprises active sonars in which an acoustic signal is emitted within the sea and the echoes returned by the obstacles whose position one wishes to ascertain are gathered. The other category comprises passive sonars which are concerned merely with listening for the noise radiated within the sea by various sources, for example the propellers of a boat. Such is the case in particular for linear acoustic arrays which are towed behind the boat and which stretch over distances of several hundred meters.

This technique has been employed to design devices which enable these arrays, essentially characteristic of a passive sonar, to be made to play a role of active sonar, by using a distinct special-purpose array to emit an acoustic signal whose echoes are received by these arrays. This function is termed the "activation function".

Referring to FIG. 1, the linear acoustic array 101 is towed by a boat 102, and in order to use it in an active manner this same boat 102 tows a fish 103 which comprises an acoustic emitter. Given the ranges of frequencies used by a linear acoustic array, which lie within the low-frequency range, the emitter contained in the fish emits in a near-omnidirectional manner by virtue of the small size of its emission arrays relative to the emission wavelength $\lambda$, made necessary by the dimensions of the fish. Such a device is in particular described in French Patent Application No. 91 03853 filed by the applicant on 29 Mar. 1991 and published on 2 Oct. 1992 under number 2 674 717.

There is also a type of active sonar, known as a "dipping" sonar and represented in FIG. 2, which includes receiving arrays 201 carried by folding arms 211 fixed to a submersible buoy body 221 and which are deployed when the body of the buoy is submerged at the required depth. This body is suspended by a cable wound on a winch fixed to a helicopter 202. It also includes an emitter 203 situated for example at the base of the buoy. The helicopter, which hovers at a fixed spot, unwinds the cable, and the body which carries the receiving array is submerged in the water. Such a sonar is in particular described in French Patent Application No. 86 13485 filed by the applicant on 26 Sep. 1986 and published on 1 Apr. 1988 under number 2 604 530. Although the frequencies used are often higher than the frequencies used in the linear array of FIG. 1, the small size of the body of the buoy precludes the fixing of a very large emitter and so the same relative conditions as before again obtain, involving substantially omnidirectional radiation of the emitter.

As a consequence of the omnidirectional nature of the radiation, these devices have the drawback of limiting the power emitted, so as not to run up against the phenomenon of cavitation, this limiting the detection range since the sound level emitted under these conditions is relatively low and since the directivity index cannot be altered precisely because of this omnidirectional nature.

Moreover, since we are at low frequency and because this antenna is relatively small, nuisance acoustic interactions are obtained between the various transducers, making control of the directivity patterns more difficult.

Finally, and more particularly in the case of a linear acoustic array, the handling of a fish, even if it is relatively small in size, involves implementational constraints related to weight and bulk, which are highly constraining during placement into the water and recovery, and hence entailing a very high cost.

SUMMARY OF THE INVENTION

To alleviate these drawbacks, the invention proposes a process of acoustic emission for sonar, principally characterized in that a separate linear acoustic array is used to emit acoustic signals whose echoes are received by the receiving array of the sonar.

In order to implement this process, the invention furthermore proposes a device of the type comprising a passive linear acoustic array intended to be towed by a boat with the aid of a hauling cable, characterized essentially in that a linear acoustic emission array, whose weight and shape enable it to be towed at a small inclination relative to the vertical, is fixed to the hauling cable, whilst the receiving array is towed substantially horizontally.

According to another characteristic, this device is of the type comprising a sonar with deployable receiving array intended to be suspended from a helicopter by a cable, and it furthermore comprises a linear acoustic emission array (803) intended to be suspended above or beneath this receiving array.

According to another characteristic, the cable for suspending the sonar forms an integral part of the linear emission array.

According to another characteristic, the linear acoustic emission array is formed by a string of transducers fixed along at least one cable.

According to another characteristic, the transducers are of the flexural strain gauge type.

According to another characteristic, the device includes means for supplying the transducers with variably weighted signals for controlling the shape of the main emission lobe.

According to another characteristic, the device furthermore comprises means for supplying the transducers with phase-shifted signals making it possible to shift the aim of the emission beam.

According to another characteristic, the device furthermore comprises a fish dragged by the towing cable and itself towing the linear receiving array; this fish including an integrated winch to which the linear emission array is fastened so as to enable this array to be wound in before the fish and the linear receiving array are together raised onto the hauling vessel.

According to another characteristic, the linear emission array is formed by a set of identical modules comprising a transducer of the flexural strain gauge type with substantially ovoid cross-section furnished with a rear fairing of substantially triangular cross-section and including, at its two ends, shackles of which one is single whilst the other is double so as to enable the single shackle of one module to be inserted into the double shackle of the adjacent module and to join them together with a fixing pin.

According to another characteristic, the transducers are articulated together so as to form a winch-wound assembly.

According to another characteristic, the emission array comprises means for mechanically interlocking these articulations so as to ensure the straightness of the array during emission and so as to release this locking during the operations of winding and unwinding the array on a winch.

BRIEF DESCRIPTION OF THE DRAWINGS

Other features and advantages of the invention will emerge clearly in the following description given by way of non-limiting example with regard to the appended figures which represent.

DISCUSSION OF THE PREFERRED EMBODIMENT

Figure 1:
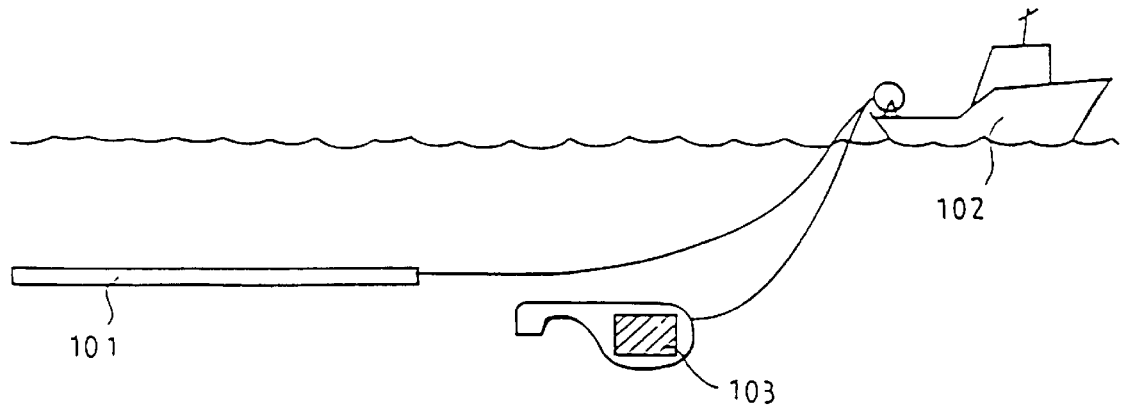
FIGS. 1 and 2, two passive sonars according to the prior art.
Figure 2:
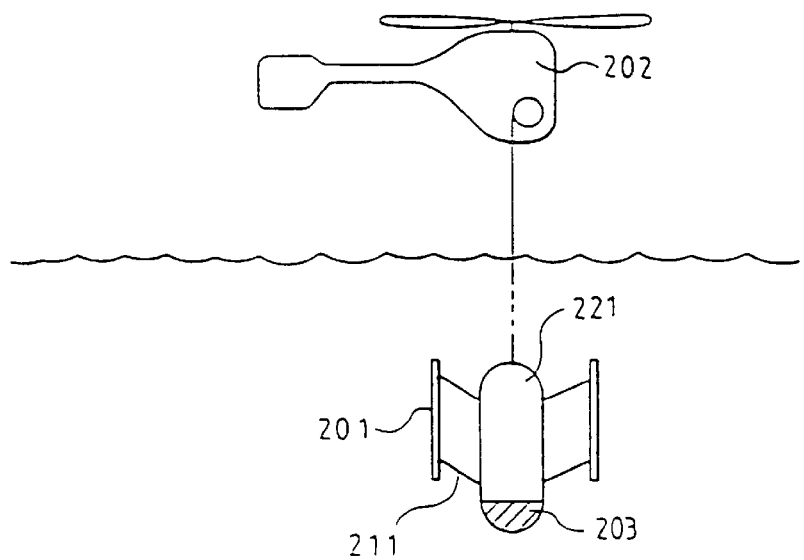
Figure 3:
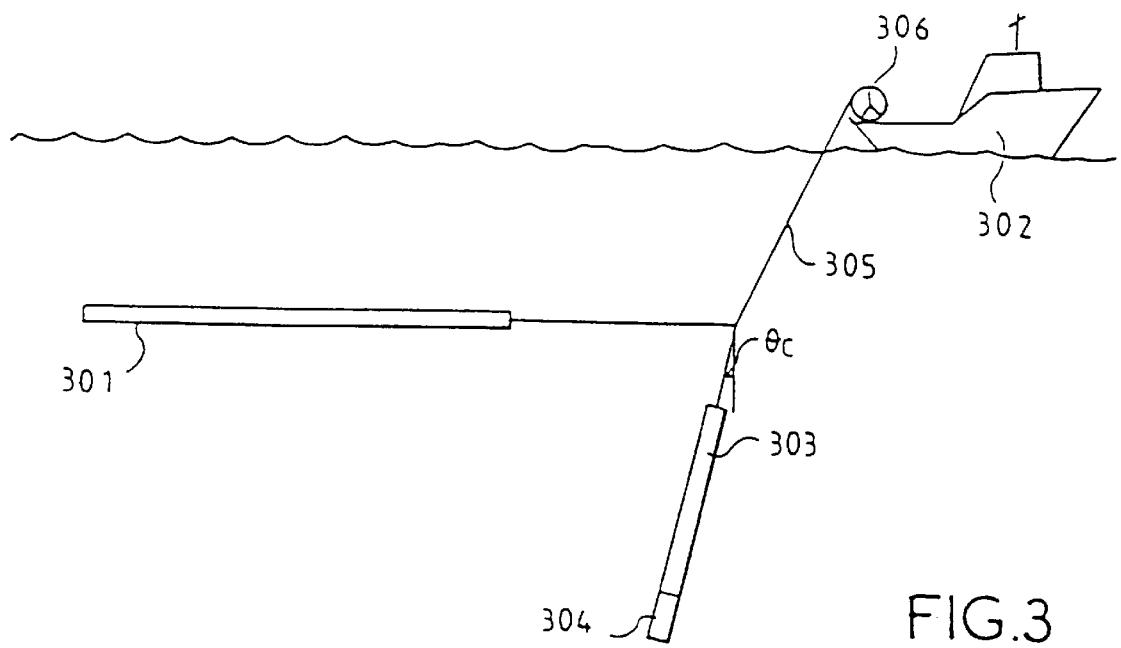
FIG. 3, a passive sonar activated according to the invention.

In the embodiment of the invention represented in FIG. 3, a towboat 302 hauls a passive linear array 301 with the aid of a hauling cable 305. This passive linear array is of known type and a description thereof will be found for example in French Patent Application No. 90 15474 filed by the applicant on 11 Dec. 1990 and published on 12 Jun. 1992 under number 2 670 350.

This purely passive array therefore receives all the noise, especially low frequency noise, propagating within the sea, for example the noise from the propellers of boats.

To use it in an active manner, so that it receives the echoes of a sonar emission arising from a system into which it is integrated, use is made according to the invention of a linear acoustic emission array 303, itself fastened to the cable 305 so as to be towed by the boat 302. This linear emission array is formed by a string of transducers, preferably of the flexural strain gauge type, advantageously fixed along one or more cables and placed in a flexible jacket. In order to hold this linear array 303 as vertical as possible despite the drag arising from the hauling, the latter preferably terminates in a nonactive part and/or a dipper 304 which enables it to be sufficiently ballasted to obtain a position close to the desired vertical position.

Figure 4:
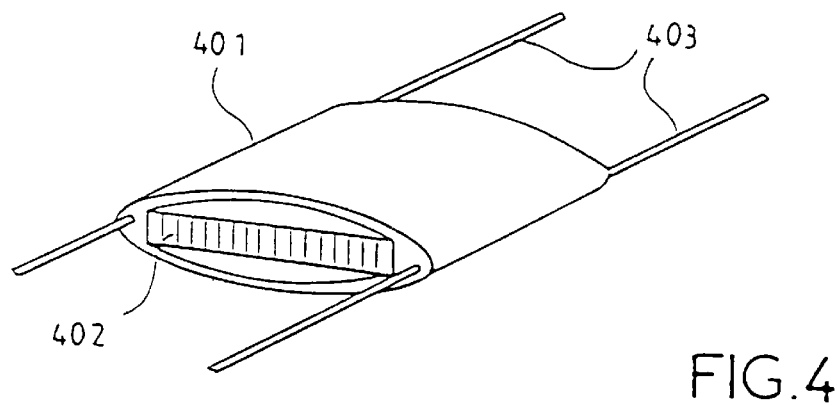
FIGS. 4 and 5, two variant embodiments of the emission transducers of a sonar according to the invention.

Different types of transducers may be envisaged, but the transducers of the flexural strain gauge type are particularly suitable for this use, and a diagrammatic view of a cross-section of the array 303 including a single one of these transducers is represented in FIG. 4. This transducer is a flexural strain gauge of the type known as a class IV composed essentially of an elliptic shell 401 which includes a piezoelectric motor 402 along its major axis. In order to be able to form a string intended to make the array 303, the two ends of the elliptic shell are drilled longitudinally to make it possible to run cables 403 onto which the successive transducers will be threaded. Fixing means, not represented, make it possible to lock these transducers at predetermined positions on the cable and to ensure the straightness of the array in the operational position so as to obtain the requisite directivity pattern in emission. The transducers are wired up with the aid of connection cables, not represented, which stretch substantially parallel to the structural cables 403. The assembly is placed inside a flexible jacket, itself filled with a protective liquid according to the same technique as that used for the linear arrays such as the array 301. The density of the liquid will preferably be greater than that of water so as to increase the weight of the array and limit its inclination under the drag forces.

Figure 5:
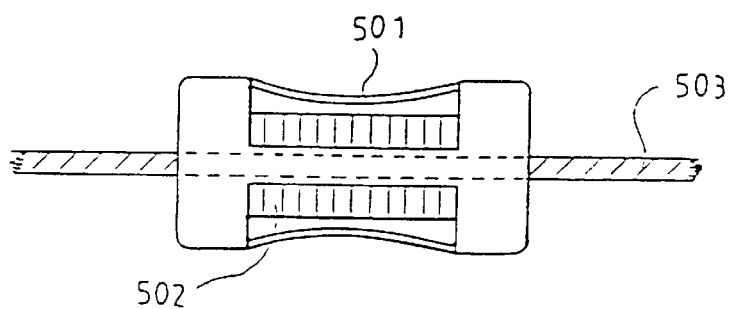

It is possible to use other types of transducers able to emit acoustic waves at the desired frequency and with the requisite power, so long as they can be manufactured at sufficiently small dimensions. By way of example, represented in FIG. 5 is another embodiment which uses a flexural strain gauge transducer of the type known as a "barrel stave", which is symmetric in the axis of the array. This transducer comprises a bobbin-shaped shell 501 which encloses a cylinder-shaped axial piezoelectric motor 502. The assembly is drilled with an axial hole which makes it possible to run a single cable 503, which plays the same role as the two cables 403 of the example represented in FIG. 4.

Other structures could also be used, for example devices comprising articulated or flexible universal joints enabling the transducers to be interlinked.

Since the emission array is required to navigate as vertically as possible, it is beneficial for its apparent density with respect to water to be as large as possible. Given the use of a large number of transducers which are themselves fairly heavy, the initial density of the structure is already relatively high. The latter will be increased by using the densest possible filling liquid, possibly loading it with a granular material which is itself as dense as possible. The weight of the array, which enables it to be held as vertical as possible, furthermore allows it to be made to act as a sinker, a role which generally devolves upon particular apparatuses, which generally take the form of an inverted aircraft wing which, by pulling the towing cable 305 towards the bed, enables the passive receiving array 301 to be held at a specified submersion while also holding it horizontally in as straight a manner as possible.

It is desirable for the linear emission array 303 to itself be as straight as possible, and for this purpose it is preferably accorded a water droplet profile, the axis of which is directed in the direction of hauling so as to reduce the drag coefficient. The use of IV type transducers such as represented in FIG. 4 implies an already substantially streamlined shape at the outset. In order perhaps to improve this, or should the basic structure be poorly streamlined, as for example in the embodiment of FIG. 5, it will be advantageous to use a fairing of appropriate shape. Furthermore, to limit the occurrence of vibrations at operational towing speeds, it will be beneficial to extend the active part of the array 303 with an inactive part 304 of the same density and the same cross-section as that of the active part.

Since the drag of the assembly is fairly large, it is beneficial when they are not being used to raise the linear arrays onto the deck of the towboat and to stow them in a minimum of space. This can be done by using a winch 306 which will make it possible to wind up the two arrays, preferably onto two separate drums each including a cable-guides device.

Even with such a towing system it is still not possible to hold the emission array 303 strictly vertical, and the latter is therefore inclined rearwards of the direction of advance by an angle $\theta_c$ relative to the vertical.

Calling W the apparent weight per linear meter in the water of the array 303, P the density of water, S the end cross-section of this array, Cx its drag coefficient, and V the towing speed, the total drag on the array is given by the formula:

$$T = \frac{1}{2} \rho S C x V^2$$

The angle of inclination $\theta_c$ relative to the vertical is then given by the formula:

$$\tan\left(\frac{\pi}{2} - \theta_c\right) = \frac{W}{T\sin\left(\frac{\pi}{2} - \theta_c\right)}$$

By way of example, for a towing speed of 8 knots, a cross-section of 0.1 m² corresponding to a diameter of 10 cm, and a relative density of the array equal to 5, the angle of inclination $\theta_c$ is equal to 10°. This amounts to saying that the linear array navigates at a slant of 10° relative to the vertical.

It is known that for a linear array comprising N transducers equispaced by $\lambda/2$, the directivity index is given by 10 log N. Under these conditions if a gain of for example 15 dB is required, 30 transducers should be used, this demanding a linear array whose length is equal to 15 $\lambda$. If the frequency used is for example 1 kHz, this length is then equal to 22.50 m. It is observed that for the same power it is possible according to the invention to use the directivity index to increase performance.

If these transducers are supplied in parallel without special weighting, the width of the main lobe of the channel transverse to the direction of the array, referred to as "broadside", is substantially equal to $\lambda/L$ in radians, i.e. in the above example 4°.

It is also known that in the case of a linear array the most slender channels are those which are formed broadside on to the array, both in emission and in reception. The best angular resolution in bearing for the linear receiving array 301 is therefore obtained on each side of the latter, perpendicularly to its axis.

For its part the linear emission array emits, if the transducers are actually supplied in parallel in a plane perpendicular to its direction and with radial symmetry about this direction. The inclination of the beam relative to the horizontal is therefore equal to $+\theta_c$ rearward of the motion of the array and to $-\theta_c$ forward, given the inclination described above. By contrast, on the sides the inclination is zero and the marine volume is swept with sound on these sides with no angular shift relative to the bed and to the surface. Since the receiving array is provided essentially to receive on the sides, the sound-sweep coincides with the direction of listening and in these cases there is therefore no need to shift the aim of the emission channels, which could be achieved for example by supplying the various transducers out of phase.

Figure 6:
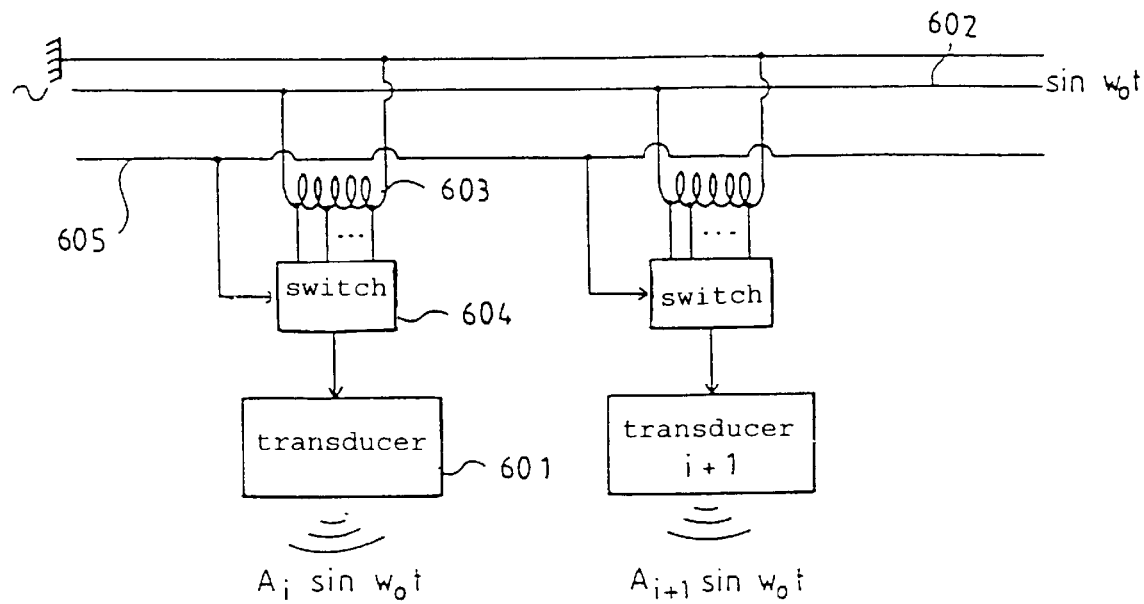
FIGS. 6 and 7, two variants of a supply system for these transducers.

Represented in FIG. 6 is an example of a circuit for supplying the various transducers 601 making up the emission array, in the case in which it is desired to weight the supply level for these transducers so as to obtain, in a known manner, a more slender main lobe and attenuated sidelobes. The emission signal, of the form sin $\omega_0$ t, arrives via a power bus 602. This bus is connected to the various transducers 601 by way of tapped transformers 603, themselves linked to switches 604. These switches 604 are of the digitally programmable type and receive programming signals by way of a bus 605 for controlling amplitudes. These signals thus make it possible to switch the taps of the transformers 603, in such a way that signals whose amplitude $A_i$ depends on the transducer and has been calculated, according to a known method, to obtain the desired weighting can be applied to the transducers 601.

It may nevertheless be desired to be able to shift the aim of the emission beams in such a way as to have accurate sound-sweeping in a sector lying outside the transverse plane, as defined above, of the receiving array. This makes it possible for example to be able to isolate and track a previously pinpointed echo which appears to originate from a sector lying outside the transverse sectors.

Figure 7:
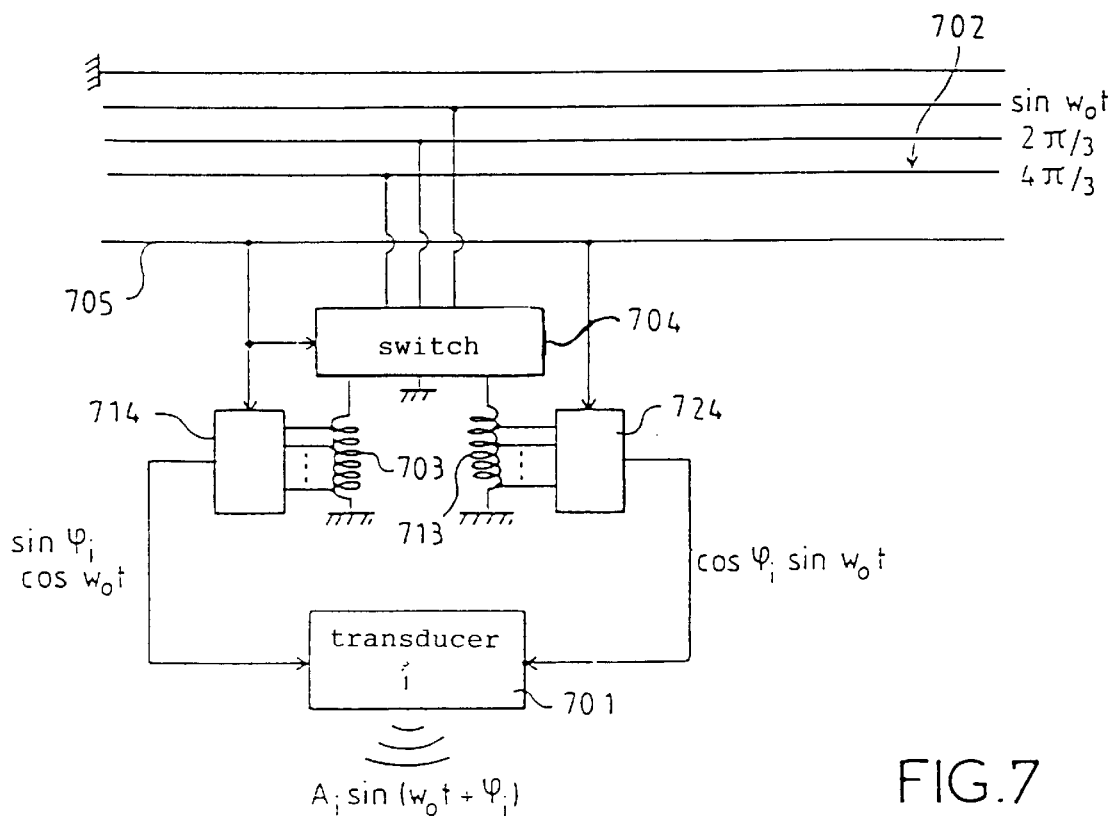

To do this, a system such as that represented in FIG. 7 will for example be used, in which a power supply bus 702 makes it possible to distribute a set of power signals shifted in phase over 360° along the linear array. In the example represented, there is a base signal sin $\omega_0$t and two other signals shifted respectively by $2\pi/3$ and $4\pi/3$. According to a variant, the base signal is used and 3 signals offset respectively by $\pi/2$, $-\pi/2$ and $\pi$ are added thereto. These signals are applied to two tapped transformers 703 and 713 by way of a switch 704. The taps of this transformer are themselves applied to switches 714 and 724 so as to be able to supply the transducers 701 differentially. Digital control signals are sent to the switches 704, 714 and 724 by a control bus 705, and these make it possible using the switch 704 to select the correctly phase-shifted supply bus line and using the switches 714 and 724 the amplitude levels required for the weighting.

The switch 714 therefore delivers a signal $\sin\phi_i \cos\omega_0 t$ and the switch 724 a signal $\cos\phi_i \sin\omega_0 t$. The combining of these two signals in the transducer 701 makes it possible to obtain an acoustic output signal $A_i \sin(\omega_0 t + \phi i)$.

The use of directive emission makes it possible, as well as increasing the directivity index, to increase the echo/reverberation ratio, this being all the more useful the smaller the depth. Indeed, in this case the reverberation arising from elevational directions lying outside the main emission lobe is greatly attenuated, this being paramount in respect of the signal-to-noise ratio when operating in shallow waters.

In order to cover the whole space it is furthermore beneficial alternately to form a channel shifted in elevation by $+\theta_c$ and a channel offset in elevation by $-\theta_c$.

In the first case, the whole of the rear space is swept horizontally with sound without obtaining any reflection on the surface and on the bed, whereas the forward beam is aimed towards the bed at an angle of elevation equal to $-2\theta_c$, this increasing the reverberation, which is advantageously eliminated at processing level, for example by windowing (elimination of close echoes).

In the second case, the reverse effect is obtained and the whole of the forward space is swept with sound horizontally, whilst the rear beam is aimed at the surface with an elevation equal to $+2\theta_c$, here again with the reverberation being eliminated through the processing.

To obtain these two successive shifts of aim, it is for example possible to use the device represented in FIG. 7 by supplementing it with a switch suitably programmed on the one hand according to two phase laws and on the other hand so as to transfer from one law to the other.

It is also possible, for a shift in aim with given elevation, to vary the width of the main lobe in a programmable manner by simultaneously modifying the amplitudes and phases of the signals applied to the transducers. To do this, it is for example possible slightly to modify the phase $\phi_i$ used, adding a further phase shift $+\phi_i$ thereto, in such a way that a phase law which is symmetric with respect to the direction of aim is applied to the transducers.

By way of enhancement, the invention proposes also to furnish the linear emission array 303 with a set of receiving hydrophones so as to be able to form reception channels in elevation. The submersion of the target can thus be measured instantaneously, either by performing a direct measurement or by performing appropriate processing, for example of the mono-pulse type.

Figure 8:
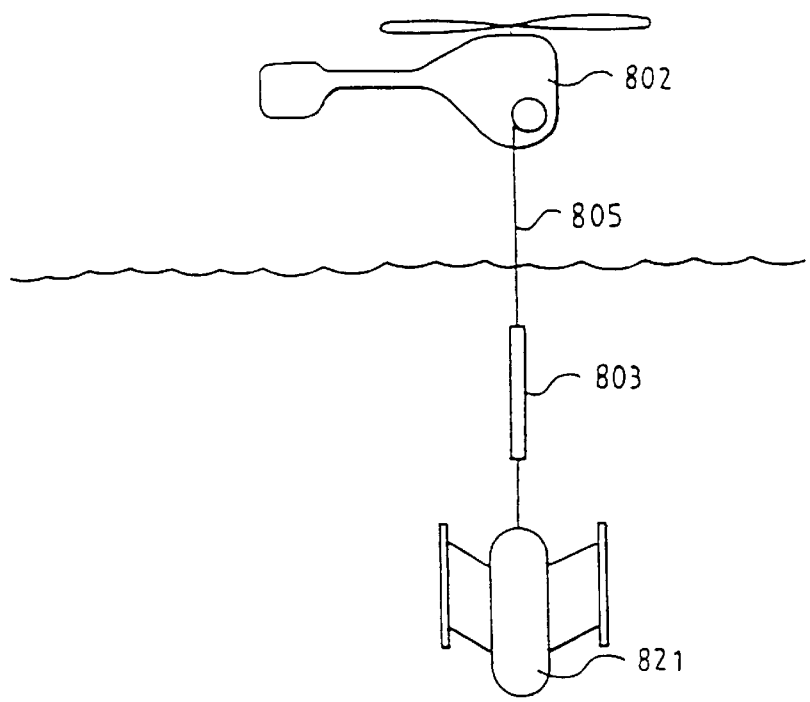
FIG. 8, a variant embodiment relating to a sonar of the "dipping" type.

The invention is not limited to the case of the acoustic linear array towed as in FIG. 3, but extends also to the case of the dipping sonar suspended from a helicopter, as represented in FIG. 8.

In this case the helicopter 802 supports the dipping sonar 821 with the aid of a cable 805.

According to the invention, a linear acoustic emission array 803, which plays the same role as the antenna 303 of FIG. 3, has been fixed to this cable. Since the helicopter remains stationary as the sonar is lowered whilst hovering, there is no longer any problem of inclination or any problem of drag. The embodiments of this array 803 will be able to be similar to all those used for the embodiment of the array 303, but the technique represented in FIG. 5 will preferably be used, this being strictly axisymmetric and the central cable itself then being the sonar support cable 805, onto which the transducers will have been threaded and fixed in the correct position. It would optionally be possible to sling the emission array under the sonar.

One of the problems of the invention in the towed mode consists, as indicated above, in maintaining the linearity of the linear array over the whole of its length, since the hauling system would tend to curve it, at least slightly.

In order that this condition can be best complied with, the invention proposes, by way of enhancement, to use for example a triangulated rigging in which the array 303 is simultaneously hauled by its upper part and by its lower part by two separate cables, this making it possible to compensate for the greatest action of the drag on the bottom of the array.

With raising the array, so as to be able to wind it easily, the lower cable then has to be detached and wound onto a second reel, the start-up of which will be delayed so as to obtain correct winding of the array.

For placement in the water the reverse operation is carried out.

Another variant consists in using a propelled rigging, in which at the lower end of the linear array 303 is fixed a propeller motor supplied from the boat, by way of the towing cable, with an electrical signal varying as a function of the speed of the towboat, in such a way as to maintain the linearity of the array by compensating for the excess drag applied to the lower end thereof. It is also possible to use several motors of this type spread along the array.

Figure 9:
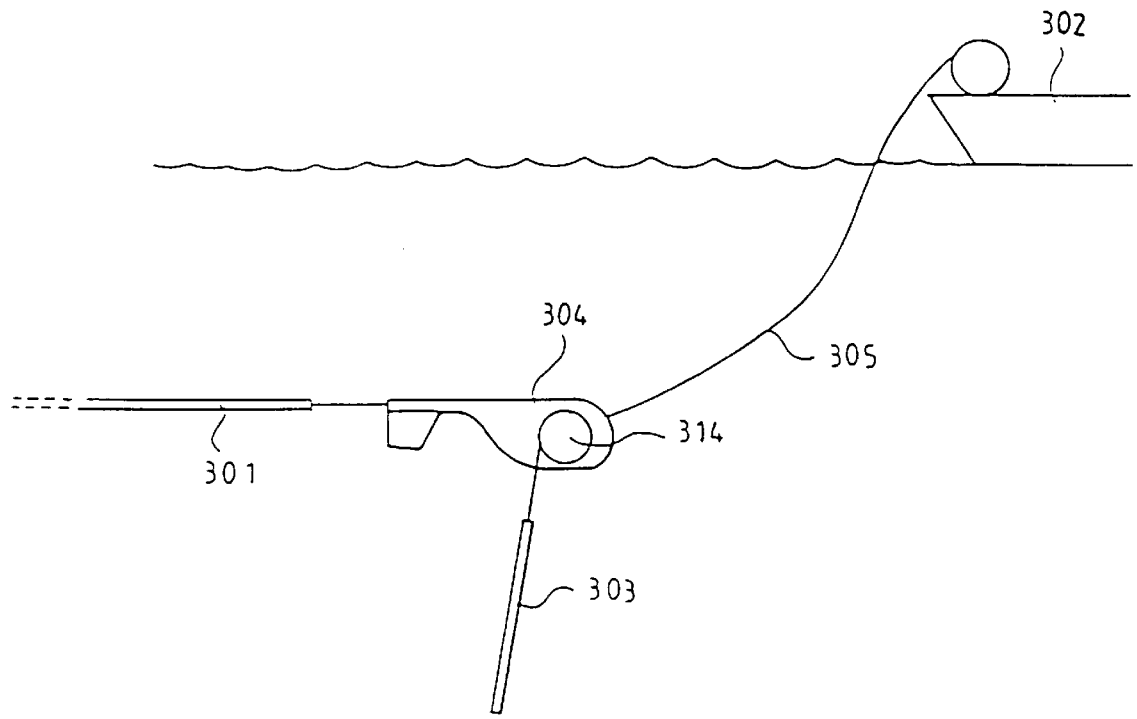
FIG. 9, a device for winding the emitting array of a sonar according to the invention.

As a variant, the invention also proposes, as represented in FIG. 9, to use a towed fish 304 to tow and wind up the linear array 303, this fish being similar to that used in the prior art and being dragged by the cable 305 and itself dragging the receiving array 301. According to the invention, inside it this fish 304 includes a winch 314 to which the linear emission array 303 is fixed by a stub of cable. To raise the assembly on board the towboat 302, the emission array 303 is firstly wound up on the winch 314 and then the cable 305 is wound up on the towing winch fixed to the boat. The receiving array 301 is lastly wound onto a separate winch, according to a known technique when using an ordinary fish.

Apart from the example embodiment described above in which the transducers lie inside a flexible jacket and are separated from one another, a beneficial variant embodiment consists in using leaktight elementary modules of streamlined shape linked together by cabling which is itself leaktight. This makes it possible to simplify the embodiment of the array and in this case a beneficial enhancement, to make it possible to maintain the straight shape of the array in the water despite the hauling loads and vibrations, consists in furnishing the ends of these separate modules with a bearing face which matches the bearing face of the adjacent module. Under these conditions, in order to rigidify the array use will be made of a cable which runs along it and which may moreover be one of the assembly cables. This cable will be fixed on one side to one of the ends, the lower end for example, of the array and on the other side to a small winch furnished with a winding motor. Thus by actuating this winding motor the modules will be brought closer together and will lock against one another, thus ensuring the rigidity and straight shape of the array.

Figure 10:
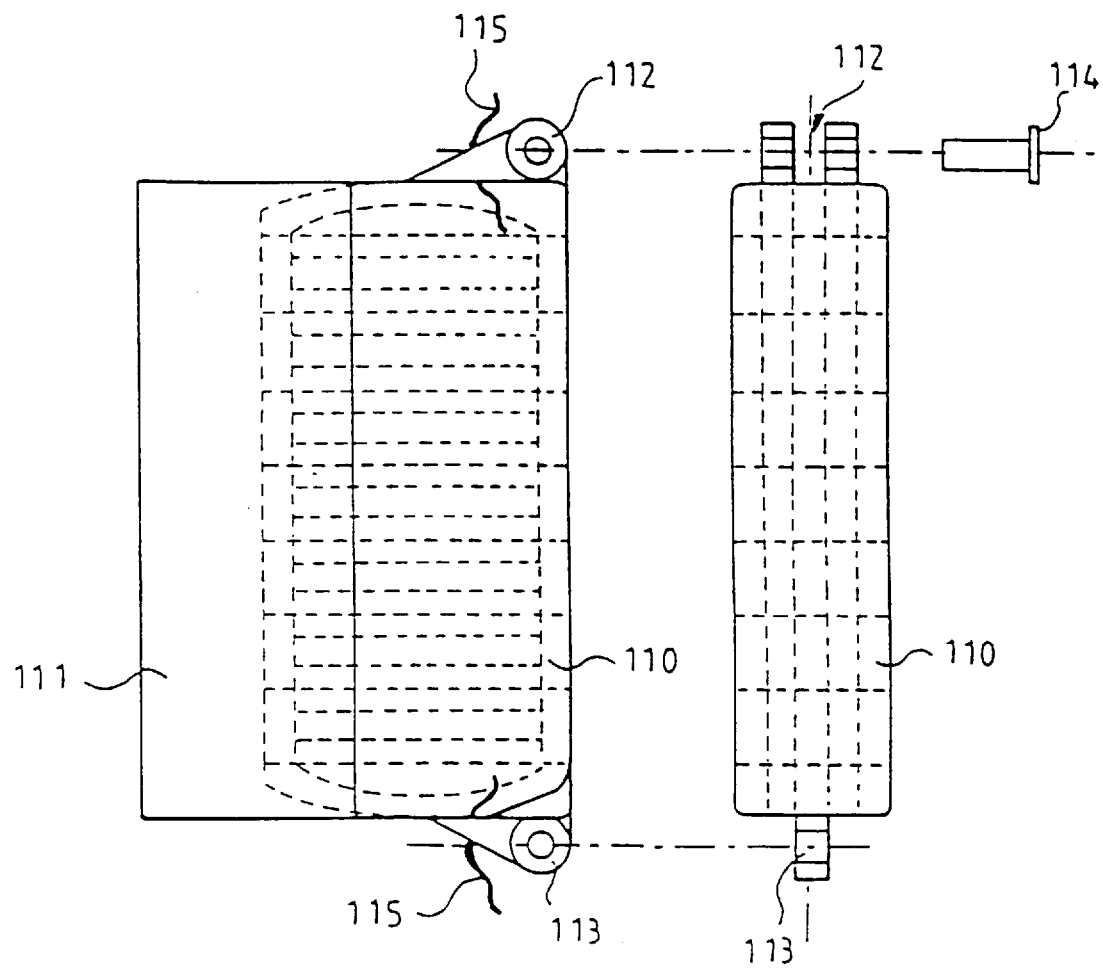
FIG. 10, end and side views of a link of an emitting array according to the invention.

In a preferred embodiment of the structure of the array, modules such as represented in FIG. 10 will be used, comprising a flexural strain gauge of the IV type with an ovoid cross-section. The rear of this flexural strain gauge is extended by a fairing 111 of substantially triangular cross-section, so as to accord the assembly a streamlined cross-section in the shape of a symmetric aircraft wing.

The ends of this flexural strain gauge terminate in shackles, of which one 112 is double and the other 113 is single. Thus one shackle 113 will be inserted into a shackle 112 of the adjacent module, and the two are fixed together with the aid of a pin 114 which goes through the holes for assembling the shackles.

The supply signals and control signals are propagated by way of electrical cables 115 which enter at one end of the module and leave it at the other end by way of leaktight seal-ways. The whole is sufficiently flexible to be able to be wound up on a reel, the dimensions of which are for example of the order of two meters. It is also possible to secure the assembly with the aid of ties passing right through the modules, here again by way of leaktight seal-ways. As appropriate, by making suitable bearing surfaces, for example planar, at the ends of the modules and by according an oblong shape to the holes in the shackles into which the pins 114 will be inserted, it will be possible to use a method of rigidification such as described above.

I claim:

1. Process of acoustic emission for a sonar, comprising the steps of:
   towing in water with the aid of a hauling cable, a passive linear acoustic array; and
   towing a separate linear acoustic array with said hauling cable wherein said separate linear acoustic array is held substantially vertical and emits signals received by said passive linear acoustic array.

2. Device for implementing an acoustic emission for a sonar comprising:
   a passive linear acoustic array;
   a separate linear acoustic array for emitting acoustic signals whose echos are received by said passive linear acoustic array;
   a hauling cable for towing said passive linear acoustic array and said separate linear acoustic array wherein said separate linear acoustic array has a weight and shape enabling it to be towed at a small inclination relative to the vertical while the receiving array is towed substantially horizontally.

3. Device for implementing acoustic emission, comprising:
- a sonar with deployable receiving array suspended from a helicopter by a cable; and
- a linear acoustic emission array suspended above or beneath the receiving array wherein the cable forms an integral part of the linear emission array.

4. A process of acoustic emission, comprising the steps of:
- suspending a sonar with deployable receiving array from a helicopter by a cable;
- suspending from said helicopter, a linear acoustic emission array wherein said linear acoustic emission array is suspended above or beneath the receiving array wherein said linear acoustic emission array emits acoustic signals whose echos are received by said receiving array or in said linear acoustic array which is held substantially vertical.

5. Device according to claim 3, characterized in that the linear acoustic emission array is formed by a string of transducers fixed along at least one cable.

6. Device according to claim 5, characterized in that the transducers are of the flexural strain gauge type.

7. Device according to claim 5, characterized in that it includes means for supplying the transducers with variably weighted signals for controlling the shape of the main emission lobe.

8. Device according to claim 7, characterized in that it furthermore comprises means for supplying the transducers with phase-shifted signals making it possible to shift the aim of the emission beam.

9. Device according to claim 2, characterized in that it furthermore comprises a fish dragged by the towing cable and itself towing the linear receiving array; this fish including an integrated winch to which the linear emission array is fastened so as to enable this array to be wound in before the fish and the linear receiving array are together raised onto the hauling vessel.

10. Device according to claim 9, characterized in that the linear emission array is formed by a set of identical modules comprising a transducer of the flexural strain gauge type with substantially ovoid cross-section furnished with a rear fairing of substantially triangular cross-section and including, at its two ends, shackles of which one is single whilst the other is double so as to enable the single shackle of one module to be inserted into the double shackle of the adjacent module and to join them together with a fixing pin.

11. Device according to claim 10, characterized in that the transducers are articulated together so as to form a winch-wound assembly.

12. Device according to claim 10, characterized in that the emission array comprises means for mechanically interlocking these articulations so as to ensure the straightness of thearray during emission and so as to release this locking during the operations of winding and unwinding the array on a winch.

* * * * *